United States Patent [19]

Matsuo et al.

[11] Patent Number: 4,847,753
[45] Date of Patent: Jul. 11, 1989

[54] PIPELINED COMPUTER

[75] Inventors: Masahito Matsuo; Toyohiko Yoshida, both of Itamishi, Japan

[73] Assignee: Mitsubishi Denki K.K., Tokyo, Japan

[21] Appl. No.: 72,708

[22] Filed: Jul. 13, 1987

[30] Foreign Application Priority Data

Oct. 7, 1986 [JP] Japan ................................ 61-239563

[51] Int. Cl.4 ........................... G06F 9/28; G06F 9/38
[52] U.S. Cl. ................................................... 364/200
[58] Field of Search ................. 364/200, 900

[56] References Cited

U.S. PATENT DOCUMENTS

| | | | |
|---|---|---|---|
| 3,559,183 | 1/1971 | Sassenguth | 364/200 |
| 4,200,927 | 4/1980 | Hughes et al. | 364/200 |
| 4,310,880 | 1/1982 | Gehman | 364/200 |
| 4,373,180 | 2/1983 | Linek | 364/200 |
| 4,471,433 | 9/1984 | Matsumoto et al. | 364/200 |
| 4,571,673 | 2/1986 | Horst et al. | 364/200 |
| 4,573,118 | 2/1986 | Damouny et al. | 364/200 |
| 4,604,691 | 8/1986 | Akagi | 364/200 |
| 4,691,277 | 9/1987 | Kronstadt et al. | 364/200 |
| 4,714,994 | 12/1987 | Materna et al. | 364/200 |
| 4,755,935 | 7/1988 | Davis et al. | 364/200 |
| 4,760,519 | 7/1988 | Papworth et al. | 364/200 |
| 4,763,253 | 8/1988 | Bluhm et al. | 364/200 |
| 4,764,861 | 8/1988 | Shibuya | 364/200 |
| 4,775,927 | 10/1988 | Hester et al. | 364/200 |
| 4,777,594 | 10/1988 | Jones et al. | 364/200 |

OTHER PUBLICATIONS

Ramamoorthly et al., "Pipeline Archetecture", Computing Surveys, vol. 9, No. 1, 3/77, pages 80-82.
Lee et al., "Branch Prediction Strategies and Branch Target Buffer Design", Computer, Jan. 1984, vol. 17, No. 1, IEEE, pp. 8-9.

Primary Examiner—Gary V. Harkcom
Assistant Examiner—Christopher H. Lynt
Attorney, Agent, or Firm—Takeuchi Patent Office

[57] ABSTRACT

A pipelined computer includes an instruction cache connected to an instruction prefetch queue for storing a target address and a target instruction, with the address of a branch instruction taken as an index, and a comparator for comparing a predicted target address stored in the instruction cache with a real target address determined upon execution of the branch instruction. When both the target addresses agree in the comparator, the decoding unit and the instruction prefetch queue continue pipeline processing without alteration.

7 Claims, 2 Drawing Sheets

PIPELINED COMPUTER

BACKGROUND OF THE INVENTION

The present invention relates to pipelined computers capable of pipeline processing instructions.

A conventional pipelined computer capable of pipeline processing instructions is shown in FIG. 3. It includes an instruction prefetch queue 1, an instruction decoding unit 2, and an instruction execution unit 3. A data bus BD connects the prefetch queue 1 and the execution unit 3 to a main memory. An address bus BA connects to the execution unit 3.

The main memory stores a plurality of instructions in a plurality of locations specified by a plurality of addresses arranged according to a predetermined rule. The access time to the main memory is much longer than the access time to data within the microprocessor. When the main memory is accessed every time an instruction is fetched, the effective processing speed is very slow no matter how fast the microprocessor is.

In order to improve this shortcoming, an instruction is fetched to the prefetch queue 1 while the main memory is not accessed. Then, the instruction to be processed is fetched in the decoding unit 2 from the prefetch queue 1. This technique reduces the instruction fetching time. While the executing unit 3 is executing an instruction, the decoding unit 2 is decoding the next instruction. As soon as the executing unit 3 completes the execution, the next instruction that has been decoded in the decoding unit 2 is executed. By carrying out such pipeline processing, the effective processing speed of a computer is increased.

However, when an instruction stream is interrupted by executing a jump or branch instruction, for example, the decoded results in the decoding unit 2 are invalidated. The data fetched in the prefetch queue 1 also is invalidated, and the prefetch queue 1 is reset to start queuing from a target address which is indicated by the program counter. Thus, the first instruction to be executed after the execution of a branch instruction is fetched from the main memory so that execution of instructions by the execution unit 3 is interrupted during this time.

In this way, when an instruction stream is interrupted because of the execution of a branch instruction, the conventional pipelined computer suffers interruption of the execution until an instruction is fetched from the main memory at a target address specified by the program counter.

SUMMARY OF THE INVENTION

Accordingly, it is an object of the invention to provide a pipelined computer with minimum interruption in the pipeline processing thereby increasing the effective processing speed.

In accordance with the invention there is provided a pipelined computer which includes a main memory for storing a plurality of instructions in a plurality of locations specified by a plurality of addresses arranged according to a predetermined rule; an instruction execution unit for executing a first instruction sequence stored in a location specified by a first address in the main memory; an instruction decoding unit for decoding a second instruction sequence stored in a location specified by a second address while the execution unit is executing the first instruction sequence; an instruction prefetch unit for fetching a third instruction sequence stored in a location specified by a third address while the instruction decoding unit is decoding the second instruction sequence; a cache memory for storing, when the instruction execution unit has executed a branch instruction stored in a location specified by a fourth address in the main memory and is to execute a target instruction sequence stored in a location specified by a target address which is not succeeding the fourth address, the target instruction sequence to be executed and the target address of the branch instruction, with the fourth address as an index; and a comparator for comparing the target address of an instruction sequence executed with the predicted target address stored in the cache memory, if the instruction cache stores an address identical with the fourth address when the third instruction sequence is fetched from the prefetch unit for decoding, the instruction decoding unit fetches from the instruction cache the branch instruction for decoding while the prefetch unit is reset to fetch from the main memory an instruction sequence succeeding the target instruction sequence fetched from the instruction cache to continue pipeline processing when both the target addresses agree in the comparator.

Other objects, features, and advantages of the invention will be apparent from the following description when taken in conjunction with the accompanying drawings.

DESCRIPTION OF THE PREFERRED EMBODIMENT

Figure 1:
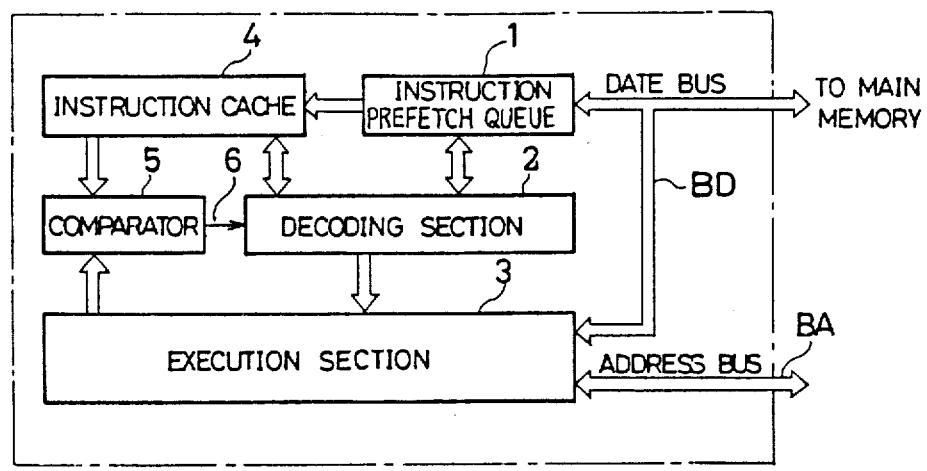
FIG. 1 is a block diagram of a pipelined computer according to an embodiment of the invention.
Figure 3:
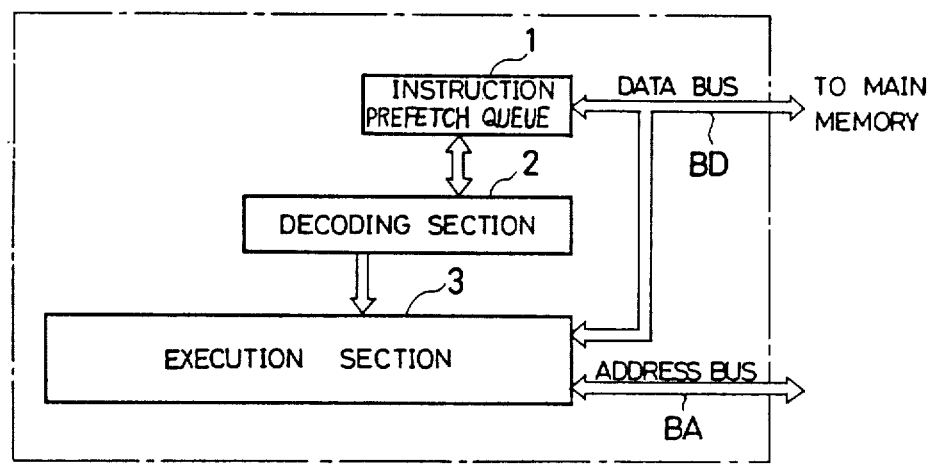
FIG. 3 is a block diagram of a conventional pipelined computer.

FIG. 1 shows a pipelined computer according to an embodiment of the invention, wherein like reference numerals designate like or corresponding elements of FIG. 3. The pipelined computer further includes an instruction cache 4 as a second memory and a comparator 5 for comparing a predicted target addresses stored in the instruction cache 4 and a real target address determined by the execution of a branch instruction. A cancel signal 6 is output to invalidate the instruction decoding which is being executed.

Figure 2:
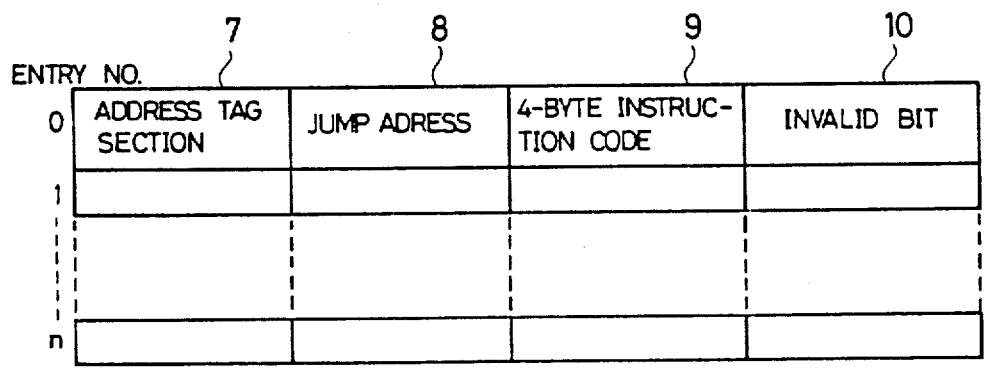
FIG. 2 shows the structure of an instruction cache according to the invention.

FIG. 2 illustrates a structure of the instruction cache 4 of FIG. 1. An address tag section 7 stores the address of a branch instruction which has interrupted an instruction stream. A jump or target address 8 is of the branch instruction which has been stored in the address tag section 7. An instruction code 9 has four bytes, for example, starting from the target address 8. When an invalid bit 10 is a logic "1" the entry is invalid.

In operation, when an instruction code is taken into the instruction decoding unit 2 from the instruction prefetch queue 1, the instruction decoding unit 2 starts decoding the instruction and accesses the instruction cache 4 at the decoded address. The instruction cache 4 stores in the address tag section 7 the address of a branch instruction, such as a jump or subroutine call instruction, which has interrupted the instruction stream when executed, the target address 8 of the branch instruction, and the instruction code 9 of four bytes which starts from the target address 8. Each entry has an invalid bit 10 indicating whether the entry is valid or not.

When the invalid bit 10 is a logic "1" there is no cache hit and the entry is invalidated. Such cache miss will take place when the instruction being decoded is not an branch instruction or is the branch instruction which is executed for the first time, or there are not desired data left in the instruction cache 4 after many other instructions are registered therein. In this case, the instruction decoding unit 2 fetches the next instruction from the instruction prefetch queue 1 to continue pipeline processing.

On the other hand, when the instruction being decoded is a branch instruction, such as a jump instruction, which has been executed before, a cache hit will occur. This means that when the branch instruction was executed before, the instruction stream was interrupted, and it is predicted this time that it is very likely that the program will jump to the same target address as the previous one. At this point, the instruction decoding unit 2 fetches the four-byte instruction code 9 from the instruction cache 4 for decoding. At the same time, the instruction prefetch queue 1 is reset to start queuing from the address four bytes ahead of the predicted target address 8.

When the branch instruction is executed in the execution unit 3 to determined a real target address, the comparator 5 compares the real target address with the predicted target address 8 fetched from the instruction cache 4. If both the target addresses agree, the prediction of the target address by the instruction cache 4 is right, and the instruction prefetch queue 1 and the instruction decoding unit 2 continue pipeline processing. Thus, it is not necessary to wait for the next instruction being fetched from the main memory after a branch instruction is executed. That is, while the branch instruction fetched from the instruction cache 4 is being executed, the instruction subsequent to the target instruction is fetched from the main memory by the instruction prefetch queue 1, thus providing smooth pipeline processing.

However, if both the target addresses do not agree in the comparator 5, the comparator 5 issues a cancel signal for cancelling the instruction decoded in the decoding unit 2, and contents of the instruction prefetch queue 1 also are invalidated. Thus, the pipeline processing is interrupted until the instruction prefetch queue 1 fetches an instruction from the main memory at the target address specified by the program counter.

If the prediction is wrong and the instruction stream is not interrupted, it is assumed in the next time that the instruction stream is not interrupted, and the entry which has produced the cache hit is invalidated by setting the invalid bit 10 at a logic "1."

When the instruction stream is interrupted as a result of cache hit but the program jumps to a target address which is different from the previous target address, the new target address is registered in the instruction cache 4. That is, when the instruction stream is interrupted despite a cache miss or the program jumps to an address different from the contents of the instruction cache 4 despite a cache hit, a registration of the instruction cache 4 is carried out. At this point, the address of an branch instruction is taken as an address tag 7, and the target address 8 and the instruction code 9 of four bytes starting from the target address 8 are stored in the instruction cache 4, and the invalid bit 10 is set at a logic "0."

When a loop instruction frequently jumps to the same address or the same subroutine is called repeatedly, the rate of cache hits becomes high. Thus, by adding such an instruction cache as described above, the interruption of a pipeline process may be minimized so as to increase the effective process speed. In the above embodiment, in the event of a cache hit, the instruction code stored in the instruction cache 4 is directly put into the instruction decoding unit 2, but when the amount of data stored in the instruction cache 4 is larger than the capacity of the input bus to the instruction decoding unit 2, part of the instruction code is put into the instruction decoding unit 2 and the rest of the instruction code may be fetched into the instruction prefetch queue 1.

In the above embodiment, in the case of a cache hit, the instruction prefetch queue 1 is reset to start queuing from an address four bytes ahead of the target address 8 in the instruction cache 4. However, under a conditional jump instruction it is possible that there is no jump this time despite the previous one. Consequently, the instruction decoding may be made by using the instruction data in the instruction cache 4, but the instruction prefetch queue 1 may not be reset to start queuing from the target address while only transfer of data to the instruction decoding unit 2 is interrupted until the two target addresses agree in the comparator 5. When the prediction is wrong and the instruction stream is not interrupted, the instruction code fetched to the instruction prefetch queue 1 may be put into the instruction decoding unit 2 to continue queuing.

As has been described above, according to the invention there is provided a pipelined computer which includes a main memory for storing a plurality of instructions in a plurality of locations specified by a plurality of addresses arranged according to a predetermined rule; an instruction execution unit for executing a first instruction sequence stored in a location specified by a first address in the main memory; an instruction decoding unit for decoding a second instruction sequence stored in a location specified by a second address while the execution unit is executing the first instruction sequence; an instruction prefetch queue for fetching a third instruction sequence stored in a location specified by a third address while the instruction decoding unit is decoding the second instruction sequence; an instruction cache for storing, when the instruction execution unit has executed a fourth instruction sequence stored in a location specified by a fourth address in the main memory and is to execute an instruction stored in a location specified by a target address which is not subsequent to the fourth address, the target address and the instruction, with the fourth address as an index; and a comparator for comparing the real target address determined in the execution unit with the predicted target address stored in the instruction cache, when the third instruction sequence is fetched from the prefetch queue for decoding, said instruction decoding unit fetches an instruction from the instruction cache for decoding if the address of the instruction is identical with the fourth address while the prefetch queue is reset to fetch from the main memory an instruction subsequent to the target address to continue pipeline processing when both the target addresses agree in the comparator, whereby the effective process speed of the system is increased when an branch instruction is executed.

While a preferred embodiment of the invention has been described using specific terms, such description is for illustrative purposes only, and it is to be understood that changes and variations may be made without departing from the spirit and scope of the invention as recited in the appended claims.

What is claimed is:

1. A pipelined computer comprising:
   first memory means for storing a plurality of instructions in a plurality of locations specified by a plurality of addresses;
   instruction execution means for executing a first instruction sequence stored in a location specified by a first address in said first memory means;
   instruction decoding means for decoding a second instruction sequence stored in a location specified by a second address while said execution means is executing said first instruction sequence;
   instruction prefetch means for fetching a third instruction sequence stored in a location specified by a third address while said instruction decoding means is decoding said second instruction sequence;
   second memory means for storing; when said instruction execution means has executed a branch instruction sequence stored in a location specified by a branch address in said first memory means and is to execute a target instruction sequence stored in a location specified by a target address which is not subsequent to said branch address, said target instruction sequence and said target address, with said branch address taken as an index; and
   comparator means for comparing a real target address of a branch instruction executed by said execution means with a predicted target address fetched from said second memory means,
   if an address of a branch instruction sequence fetched from said instruction prefetch means for decoding is identical with a branch address stored in said second memory means, said instruction decoding means fetches from said second memory means a target instruction sequence for decoding while said prefetch means is reset to fetch from said first memory an instruction sequence subsequent to said target instruction sequence to continue pipeline processing when a real target address determined upon execution of said branch instruction sequence by said execution means agrees with a predicted target address fetched from said second memory means are in agreement in said comparator means.

2. The pipelined computer of claim 1, wherein said comparator means consists of a comparator for comparing a real target address determined by execution of said branch instruction with a predicted target address stored in said second memory means; and
   said instruction prefetch means consists of an instruction prefetch queue,
   when said real target address does not agree with said predicted target address in said comparator, said comparator issues a cancel signal for invalidating results decoded by said decoding means and contents of said instruction prefetch queue are also invalidated so that said prefetch queue fetches new instructions from said first memory means.

3. The pipelined computer of claim 1, wherein said second memory means is an instruction cache which stores addresses of branch instructions, target addresses determined by execution of said branch instructions, and instruction codes of four bytes which start from said target addresses.

4. The pipelined computer of claim 3, wherein said instruction decoding means consists of an instruction decoder which, when a cache hit occurs, fetches a target instruction code from said instruction cache for decoding while contents of said instruction prefetch queue are invalidated to start queuing from an address four bytes ahead of said predicted target address, whereby when a real target address determined by execution of said branch address agrees with a predicted target address fetched from said instruction cache, said prefetch queue and said decoder continue processing without any alteration.

5. A pipelined computer comprising:
   a main memory for storing a plurality of instructions in a plurality of locations specified by a plurality of addresses;
   an instruction prefetch queue for fetching a line of instructions from said main memory while said main memory is not accessed;
   an instruction decoding unit for decoding instructions fetched by said instruction prefetch queue while said instruction prefetch queue is fetching subsequent instructions;
   an instruction execution unit for executing instructions decoded by said instruction decoding unit while said instruction decoding unit is decoding subsequent instructions, thus providing pipeline processing;
   an instruction cache for storing addresses of branch instructions which have been recently executed by said execution unit, target addresses determined upon execution of said branch instructions, and target instruction codes of said target addresses; and
   a comparator for comparing real target addresses determined by said execution unit with predicted target addresses stored in said instruction cache;
   when an address of a branch instruction fetched from said instruction prefetch queue matches an address stored in said instruction cache, said instruction decoding unit fetches a target instruction code from said instruction cache for decoding while said prefetch queue is reset to fetch a subsequent instruction from said main memory, and
   when a real target address determined by said execution unit agrees with a predicted target address stored in said instruction cache, said prefetch queue and said decoding unit continue processing, thus providing uninterrupted pipeline processing.

6. The pipelined computer of claim 5, wherein when said real target address does not agree with said predicted target address, said comparator issues a cancel signal for invalidating decoded results of said decoding unit and contents of said prefetch queue to fetch a new line of instructions from said main memory.

7. The pipelined computer of claim 5, wherein said target instruction code has four bytes starting from said target address.

* * * * *